United States Patent
Xu

(10) Patent No.: US 12,362,558 B2
(45) Date of Patent: Jul. 15, 2025

(54) ESD PROTECTION APPARATUS AND CONTROL METHOD

(71) Applicant: LEN TECH Inc., Plano, TX (US)

(72) Inventor: Gonggui Xu, Plano, TX (US)

(73) Assignee: LEN TECH Inc., Plano, TX (US)

( * ) Notice: Subject to any disclaimer, the term of this patent is extended or adjusted under 35 U.S.C. 154(b) by 200 days.

(21) Appl. No.: 18/200,564

(22) Filed: May 22, 2023

(65) Prior Publication Data
US 2024/0396328 A1    Nov. 28, 2024

(51) Int. Cl.
*H02H 9/04* (2006.01)
*G05F 1/46* (2006.01)

(52) U.S. Cl.
CPC ............... *H02H 9/046* (2013.01); *G05F 1/46* (2013.01)

(58) Field of Classification Search
CPC .................................. H02H 9/046; G05F 1/46
See application file for complete search history.

(56) References Cited

U.S. PATENT DOCUMENTS

| | | | | |
|---|---|---|---|---|
| 4,930,036 A | * | 5/1990 | Sitch | H02H 9/046 361/111 |
| 5,771,140 A | * | 6/1998 | Kim | H02H 9/046 361/111 |
| 7,541,840 B2 | * | 6/2009 | Jeon | H10D 89/813 327/437 |
| 8,243,404 B2 | * | 8/2012 | Ker | H02H 9/046 361/111 |
| 2008/0130181 A1 | * | 6/2008 | Pinna | H02H 9/046 361/56 |
| 2013/0215541 A1 | * | 8/2013 | Karp | H03K 19/00346 361/56 |
| 2015/0077886 A1 | * | 3/2015 | Chen | H02H 9/046 361/56 |
| 2015/0214731 A1 | * | 7/2015 | Tsurui | H02H 9/046 327/109 |
| 2020/0091136 A1 | * | 3/2020 | de Raad | H02H 9/046 |

* cited by examiner

*Primary Examiner* — Thienvu V Tran
*Assistant Examiner* — Muaamar Qahtan Al-Taweel
(74) *Attorney, Agent, or Firm* — AP3 Law Firm PLLC

(57) ABSTRACT

An ESD protection apparatus includes a first clamping device and a second clamping device connected in series between a bias voltage bus and ground, and a switch coupled between an input/output pad and a common node of the first clamping device and the second clamping device, wherein the switch is configured such that before a bias voltage on the bias voltage bus has been established, a leakage current flowing through the first clamping device is reduced.

19 Claims, 8 Drawing Sheets

ESD PROTECTION APPARATUS AND CONTROL METHOD

TECHNICAL FIELD

The present invention relates to an electrostatic discharge (ESD) protection apparatus and control method, and, in particular embodiments, to control methods for reducing or eliminating leakage currents flowing through the ESD protection apparatus.

BACKGROUND

Integrated circuits may be severely damaged by ESD events. ESD is a rapid discharge that flows between two objects due to the built-up of static charge. ESD may destroy semiconductor devices because the rapid discharge can produce a relatively large current.

The damage from ESD can be categorized into three industry-standard ESD models, namely a human-body model (HBM), a machine model (MM) and a charged device model (CDM). The human-body model is a simulation of the discharge which might occur when a human body touches an electronic device. The discharge of the human body generates peak currents up to several amperes in a short period (e.g., 100 ns). The machine model simulates a discharge from some conductive objects such as a metallic object. The charged-device model is a model for characterizing the susceptibility of an electronic device to damage from ESD.

In order to reduce semiconductor failures due to ESD, ESD protection circuits have been developed to provide a current discharge path. For example, NMOS transistors, Silicon-Controlled Rectifiers (SCRs) and RC triggered PMOS transistors are widely used to provide a conductive path to dissipate ESD energy. When an ESD event occurs, the discharge current is conducted through the discharge path without going through the internal circuits to be protected. As a result, the internal circuits are kept from being damaged.

In a conventional ESD protection circuit, a clamping diode is coupled between an input/output pad and a bias voltage bus. Various internal loads are also coupled to the bias voltage bus. Before the bias voltage has been established, the voltage on the input/output pad may be higher than the voltage on the bias voltage bus. As a result, a leakage path is formed between the input/output pad and the bias voltage bus. Such a leakage path causes unnecessary power losses.

Power consumption has become an important performance index of semiconductor integrated circuits. The leakage current from ESD protection circuit may cause unnecessary power losses. It would be desirable to have a low leakage current ESD protection circuit to reduce or eliminate the leakage current. The present disclosure addresses this need.

SUMMARY

These and other problems are generally solved or circumvented, and technical advantages are generally achieved, by preferred embodiments of the present disclosure which provide control methods for reducing or eliminating leakage currents flowing through the ESD protection apparatus.

In accordance with an embodiment, an apparatus comprises a first clamping device and a second clamping device connected in series between a bias voltage bus and ground, and a switch coupled between an input/output pad and a common node of the first clamping device and the second clamping device, wherein the switch is configured such that before a bias voltage on the bias voltage bus has been established, a leakage current flowing through the first clamping device is reduced.

In accordance with another embodiment, a method comprises providing a switch coupled between an input/output pad and a common node of a first clamping device and a second clamping device, wherein the first clamping device and the second clamping device are connected in series between a bias voltage bus and ground, prior to establishing a bias voltage on the bias voltage bus, configuring the switch to reduce a leakage current flowing through the first clamping device, and turning on the switch after the bias voltage has been established.

In accordance with yet another embodiment, an integrated circuit comprises a first clamping device and a second clamping device connected in series between a bias voltage bus and ground, a switch coupled between an input/output pad and a common node of the first clamping device and the second clamping device, a low-dropout regulator configured to provide a bias voltage on the bias voltage bus, wherein the low-dropout regulator is controlled by an enable signal, and a load coupled to the bias voltage bus, wherein the switch is controlled to prevent a leakage current from flowing from the input/output pad to the load.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an ESD protection apparatus and the associated control methods for reducing or eliminating leakage currents flowing through the ESD protection apparatus. The disclosure may also be applied, however, to a variety of integrated circuits. Hereinafter, various embodiments will be explained in detail with reference to the accompanying drawings.

Figure 1:
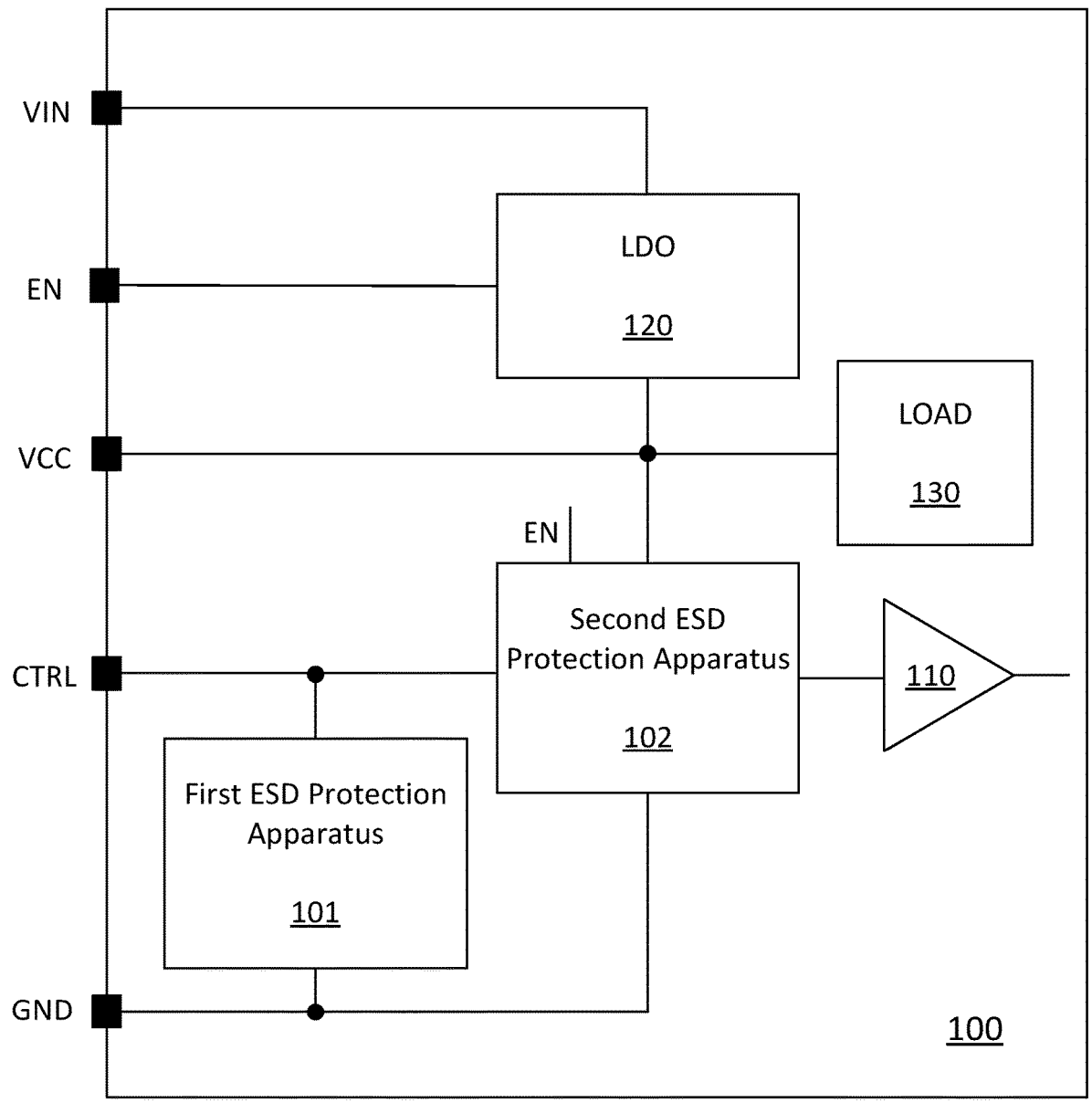
FIG. 1 illustrates a block diagram of an integrated circuit in accordance with various embodiments of the present disclosure.

FIG. 1 illustrates a block diagram of an integrated circuit in accordance with various embodiments of the present disclosure. The integrated circuit 100 comprises a plurality of functions units including a first ESD protection apparatus 101, a second ESD protection apparatus 102, a buffer 110, a low-dropout (LDO) regulator 120 and a load 130. The integrated circuit 100 further comprises a plurality of input/output pads including an input voltage (VIN) pad, an enable signal (EN) pad, a bias voltage (VCC) pad, a control signal (CTRL) pad and a ground (GND) pad. The control signal pad is an input/output pad of the integrated circuit 100. Throughout the description, the control signal pad may be alternatively referred to as an input/output pad.

The function units shown in FIG. 1 is merely an example, which should not unduly limit the scope of the claims. Depending on different applications and design needs, other function units may be included in the integrated circuit 100. Likewise, depending on different applications and design needs, additional input/output pads may be employed.

As shown in FIG. 1, the first ESD protection apparatus 101 is connected between pads CTRL and GND. The first ESD protection apparatus 101 is employed to handle the HBM stress in an ESD event. In some embodiments, the first ESD protection apparatus 101 is implemented as a grounded-gate n-type metal-oxide-semiconductor (NMOS) transistor. The NMOS transistor is used to protect the input/output pad CTRL. The NMOS transistor provides a conductive path for the large amount of energy in an ESD event. More particularly, the NMOS transistor comprises a parasitic NPN bipolar transistor. The drain (n-type) of the NMOS transistor acts as a collector of the bipolar transistor. The drain is connected to CTRL. The source (n-type) acts as an emitter of the bipolar transistor. The substrate (p-type) acts as a base of the bipolar transistor. When an ESD event appears upon CTRL, the collector-base junction of the parasitic bipolar transistor becomes reverse biased to the point of avalanche breakdown. At this point, the positive current flowing from the base to ground induces a voltage potential across a parasitic resistor coupled between the base and the emitter, causing a positive voltage across the base-emitter junction of the bipolar transistor. The positive base-emitter forward biases trigger the turn-on of the parasitic bipolar transistor to dissipate ESD energy. The detailed structure of the first ESD protection apparatus 101 will be shown below with respect to FIG. 2.

As shown in FIG. 1, the second ESD protection apparatus 102 is connected between pads VCC and GND. The second ESD protection apparatus 102 is employed to handle the CDM stress in an ESD event. An input of the second ESD protection apparatus 102 is connected to the pad CTRL. An output of the second ESD protection apparatus 102 is connected to an input of the buffer 110. In some embodiments, the second ESD protection apparatus 102 comprises a first clamping device, a second clamping device, a switch, a first resistor, a second resistor and a plurality of control units (e.g., delay control and filter). The first clamping device and the second clamping device are connected in series between VCC and GND. The second resistor, the switch and the first resistor are connected in cascade between CTRL and a common node of the first clamping device and the second clamping device. The plurality of control units is employed to generate a gate drive signal applied to the switch. The detailed structure of the second ESD protection apparatus 102 will be shown below with respect to FIG. 2.

In some embodiments, the first clamping device is implemented as a first diode. The second clamping device is implemented as a second diode clamp. The first diode and the second diode clamp the input of the buffer 110 to VCC and GND, respectively.

As shown in FIG. 1, the LDO 120 is connected between pads VIN and VCC. The enable signal EN is used to control the operation of the LDO 120. In particular, when the LDO is enabled, VCC is established. On the other hand, when the LDO is disabled, the voltage on the VCC bus is approximately equal to zero. The load 130 is connected to VCC. The load 130 represents various circuits supplied by the bias voltage bus VCC.

Figure 2:
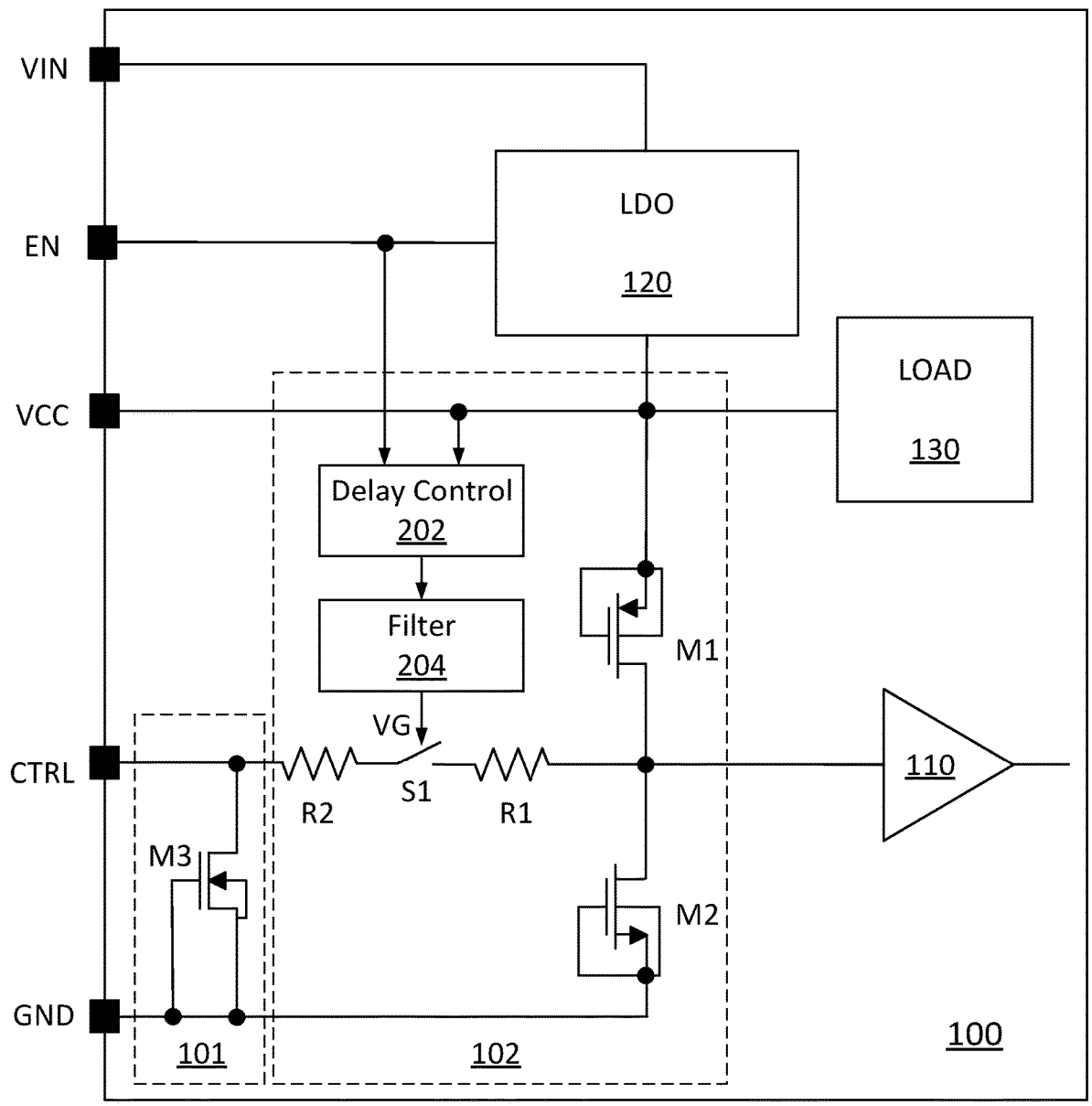
FIG. 2 illustrates a schematic diagram of the integrated circuit shown in FIG. 1 in accordance with various embodiments of the present disclosure.

FIG. 2 illustrates a schematic diagram of the integrated circuit shown in FIG. 1 in accordance with various embodiments of the present disclosure. The first ESD protection apparatus 101 comprises a grounded-gate n-type transistor M3. The second ESD protection apparatus 102 comprises a first clamping device M1, a second clamping device M2, a switch S1, a first resistor R1, a second resistor R2, a delay control unit 202 and a filter 204. As shown in FIG. 2, the first clamping device M1 is a p-type transistor. The second clamping device is an n-type transistor. As shown in FIG. 2, the first clamping device M1 and the second clamping device M2 are connected in series between the bias voltage bus VCC and ground. The second resistor R2, the switch S1 and the first resistor R1 are connected in series between CTRL and a common node of the first clamping device M1 and the second clamping device M2.

The delay control unit 202 is configured to receive the enable signal EN and the bias voltage VCC, and generate a gate drive signal for controlling the operation of the switch S1. The filter 204 has an input coupled to an output of the delay control unit 202, and an output configured to generate a gate drive signal for controlling the switch S1.

The integrated circuit 100 further comprises an LDO 120, a load 130 and a buffer 110. The LDO 120 has an input connected to VIN and an output connected to VCC. The LDO 120 is configured to provide the bias voltage on the bias voltage bus VCC. The LDO 120 is configured to receive an enable signal EN. The enable signal EN is employed to control the on and off of the LDO 120. The operation principle of the LDO is well known in the art, and hence is not discussed in detail herein.

The load 130 is coupled to the bias voltage bus VCC. The load 130 represents a variety of impedances and currents from internal loads of the integrated circuit 100. The buffer 110 has an input connected to the common node of the first clamping device and the second clamping device. In some embodiments, the buffer 110 is configured to keep the signal source from being affected by the load. In alternative embodiments, the buffer 110 may be a driver configured to boost the current source/sink level, or the voltage at which it delivers to downstream circuits.

As shown in FIG. 2, the first clamping device M1 is a p-type transistor. A source terminal, a body terminal and a gate terminal of the p-type transistor is connected to the bias voltage bus VCC. A drain terminal of the p-type transistor is connected to the second clamping device M2.

The second clamping device M2 is an n-type transistor. A source terminal, a body terminal and a gate terminal of the n-type transistor are connected to ground. A drain terminal of the n-type transistor is connected to the first clamping device M1. In operation, the p-type transistor M1 functions as a first clamping diode. The n-type transistor M2 functions as a second clamping diode. A cathode of the first clamping diode is connected to the bias voltage bus VCC. An anode of the first clamping diode is connected to a cathode of the second clamping diode. An anode of the second clamping diode is connected to ground. In an ESD event, the first clamping diode clamps the voltage fed into the buffer 110 to VCC. The second clamping diode clamps the voltage fed into the buffer 110 to GND.

As shown in FIG. 2, the first ESD protection apparatus 101 is implemented as a grounded-gate n-type transistor M3 connected between the input/output pad CTRL and ground. As shown in FIG. 2, a source terminal, a body terminal and a gate terminal of the grounded-gate n-type transistor M3 is connected to ground. A drain terminal of the grounded-gate n-type transistor M3 is connected to the input/output pad CTRL.

In operation, when a positive ESD event occurs at CTRL, the collector-base junction of the parasitic bipolar transistors becomes reverse biased to the point of avalanche breakdown. At this point, the positive current flowing from the base to ground induces a voltage potential across the parasitic resistor connected between the base and the bulk. The voltage across the parasitic resistor causes a positive voltage across the base-emitter junction of the parasitic bipolar transistor. The positive voltage triggers the conduction of the parasitic bipolar transistor. The conducted parasitic bipolar transistor provides a conductive path to dissipate ESD energy.

The second resistor R2, the switch S1 and the first resistor R1 are connected in cascade between CTRL and the common node of M1 and M2. In accordance with an embodiment, the switch S1 may be a metal oxide semiconductor field-effect transistor (MOSFET) device. More particularly, S1 is an n-type MOSFET device. The drain of S1 is connected to R2. The source of S1 is connected to R1. The gate of S1 is controlled by VG. Alternatively, the switch S1 can be any controllable switches. Furthermore, the switch S1 may be an isolation switch comprising two back-to-back connected MOSFET devices. The second resistor R2 is employed to protect the switch S1. The resistance of R2 is in a range from 1 Kiloohms to 10 Kiloohms. The first resistor R1 is employed to limit the charge current in an ESD event. The resistance of R1 is in a range from 1 Kiloohms to 10 Kiloohms.

In operation, the switch S1 is configured such that before a bias voltage on the bias voltage bus VCC has been established, a leakage current flowing through the first clamping device M1 is reduced or eliminated. In some embodiments, prior to establishing the bias voltage, the switch S1 is turned off to prevent the leakage current from flowing from the input/output pad to the load. After establishing the bias voltage, the switch S1 is turned on. It should be noted that the switch S1 is turned on when the bias voltage is greater than or equal to a voltage on the input/output pad. In alternative embodiments, the switch S1 is turned on after receiving a system command.

In an embodiment of the turn-on process of the switch S1, the bias voltage VCC is established at a first time instant once receiving the enable signal. After a predetermined delay from the first time instant, the switch S1 is turned on at a second time instant. The detailed operating principle of this gate drive control scheme of S1 will be described below with respect to FIG. 4.

In another embodiment of the turn-on process of the switch S1, the bias voltage VCC is established at a first time instant once receiving the enable signal. From the first time instant to a second time instant, the gate voltage of the switch S1 is increased in a linear manner from a first predetermined voltage to a second predetermined voltage. The detailed operating principle of this gate drive control scheme will be described below with respect to FIG. 5.

In yet another embodiment of the turn-on process of the switch S1, the bias voltage VCC is established at a first time instant once receiving the enable signal. After a predetermined delay from the first time instant, the gate voltage of the switch S1 is increased from a first predetermined voltage to a second predetermined voltage at a second time instant. The detailed operating principle of this gate drive control scheme will be described below with respect to FIG. 6.

In yet another embodiment of the turn-on process of the switch S1, the bias voltage VCC is established at a first time instant once receiving the enable signal. Prior to feeding the enable signal to the low-dropout regulator, the gate voltage of the switch S1 is increased in a linear manner from a first predetermined voltage until the gate voltage reaches a second predetermined voltage at a second time instant. The detailed operating principle of this gate drive control scheme will be described below with respect to FIG. 7.

Figure 3:
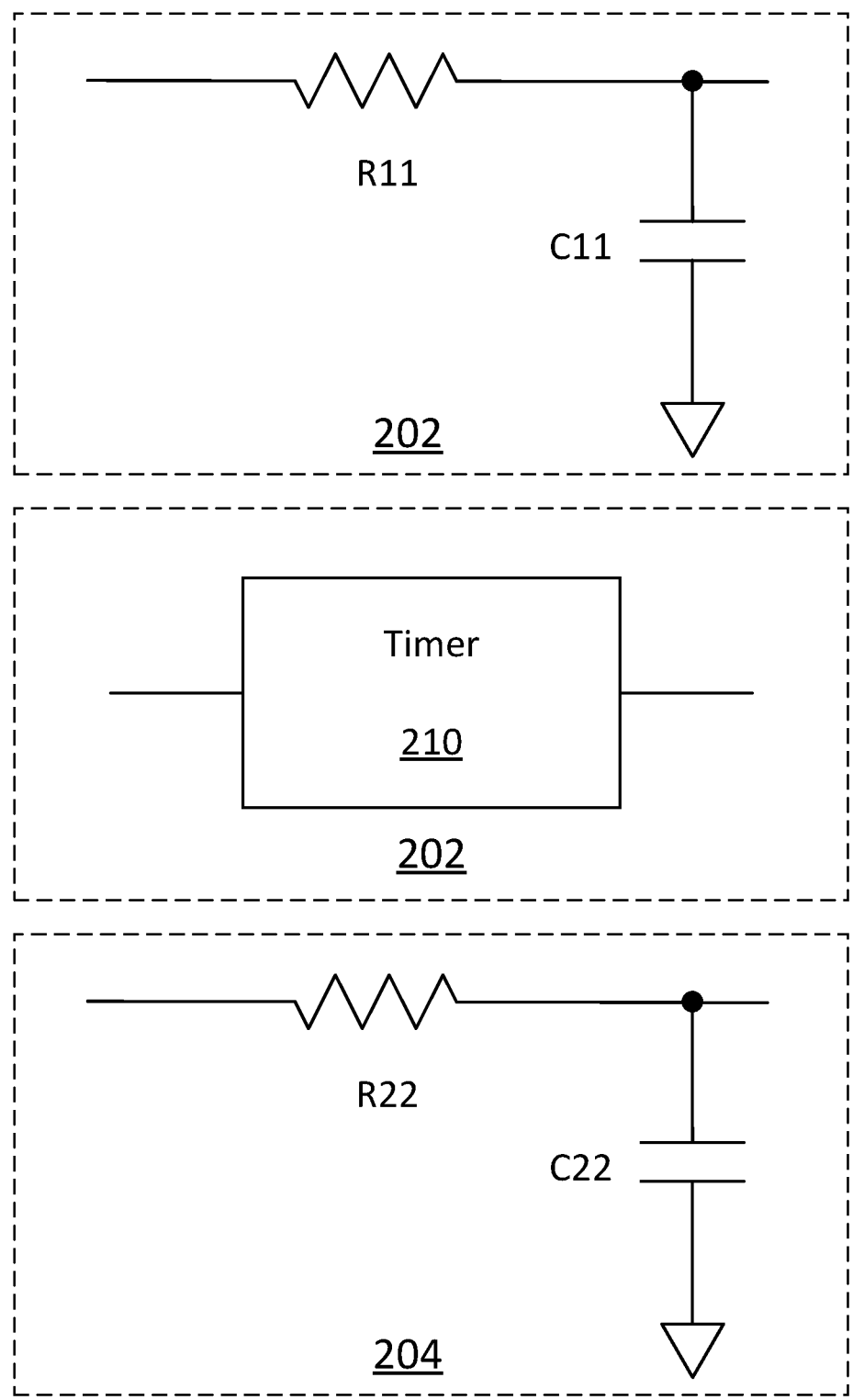
FIG. 3 illustrates schematic diagrams of the delay control unit and the filter shown in FIG. 2 in accordance with various embodiments of the present disclosure.

FIG. 3 illustrates schematic diagrams of the delay control unit and the filter shown in FIG. 2 in accordance with various embodiments of the present disclosure. In a first implementation of the delay control unit 202, a resistor R11 and a capacitor C11 form the delay control unit 202. The delay control unit causes a time-shift of the input signal (e.g., EN signal). Based on this time-shift, a predetermined delay is generated. This predetermined delay is used to determine the turn-on time instant of the switch S1.

In a second implementation of the delay control unit, a timer 210 forms the delay control unit. The operating principle of the timer is well known in the art, and hence is not discussed herein.

A resistor R22 and a capacitor C22 form the filter 204. The delayed signal is fed into the filter 204. The filter 204 is able to remove unwanted components of the delayed signal and generate a clean gate drive signal applied to the switch S1.

Figure 4:
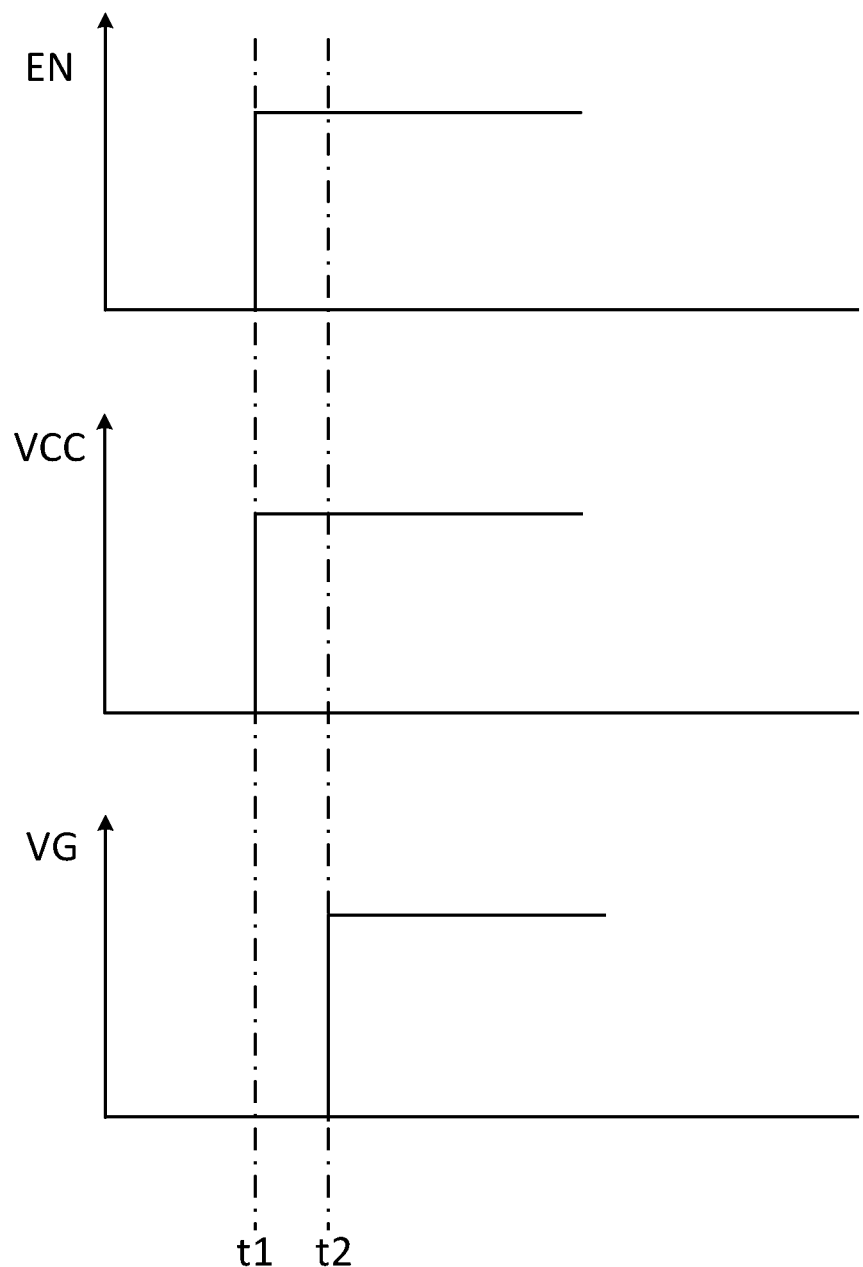
FIG. 4 illustrates a first implementation of the gate drive control scheme applied to the switch S1 shown in FIG. 2 in accordance with various embodiments of the present disclosure.

FIG. 4 illustrates a first implementation of the gate drive control scheme applied to the switch S1 shown in FIG. 2 in accordance with various embodiments of the present disclosure. The horizontal axis of FIG. 4 represents intervals of time. There may be three rows in FIG. 4. The first row represents the enable signal EN. The second row represents the bias voltage VCC. The third row represents the gate drive signal applied to the switch S1.

Referring back to FIG. 2, the enable signal EN is employed to control the on and off of the LDO 120. When the enable signal EN is of a logic low state, the LDO 120 is disabled. On the other hand, when the enable signal EN is of a logic high state, the LDO 120 is enabled. In operation, after receiving an enable signal having a logic high state, the LDO 120 is activated to generate the bias voltage VCC.

As shown in FIG. 4, prior to t1, EN is of a logic low state. In response to this logic low state, the LDO 120 is turned off. The bias voltage VCC is approximately equal to zero. Since VCC is not established, the gate drive signal of S1 is equal to zero. In response to this gate drive signal, the switch S1 is turned off.

At t1, the enable signal EN changes from a logic low state to a logic high state. In response to this change, the LDO 120 is turned on and VCC is established at t1. Referring back to FIG. 2, the EN signal and VCC are fed into the delay control unit 202 where the gate drive signal VG is generated after a predetermined delay (e.g., from t1 to t2). At t2, VG changes from zero to a predetermined gate drive voltage. This predetermined gate drive voltage turns on the switch S1. Once S1 is turned on, a conductive path is formed between the input/output pad CTRL and the input of the buffer 110.

One advantageous feature of the gate drive control scheme shown in FIG. 4 is that the leakage current is prevented before VCC is established at t1. After VCC is established at t1 and S1 is turned on at t2, the normal CTRL function can be maintained.

Figure 5:
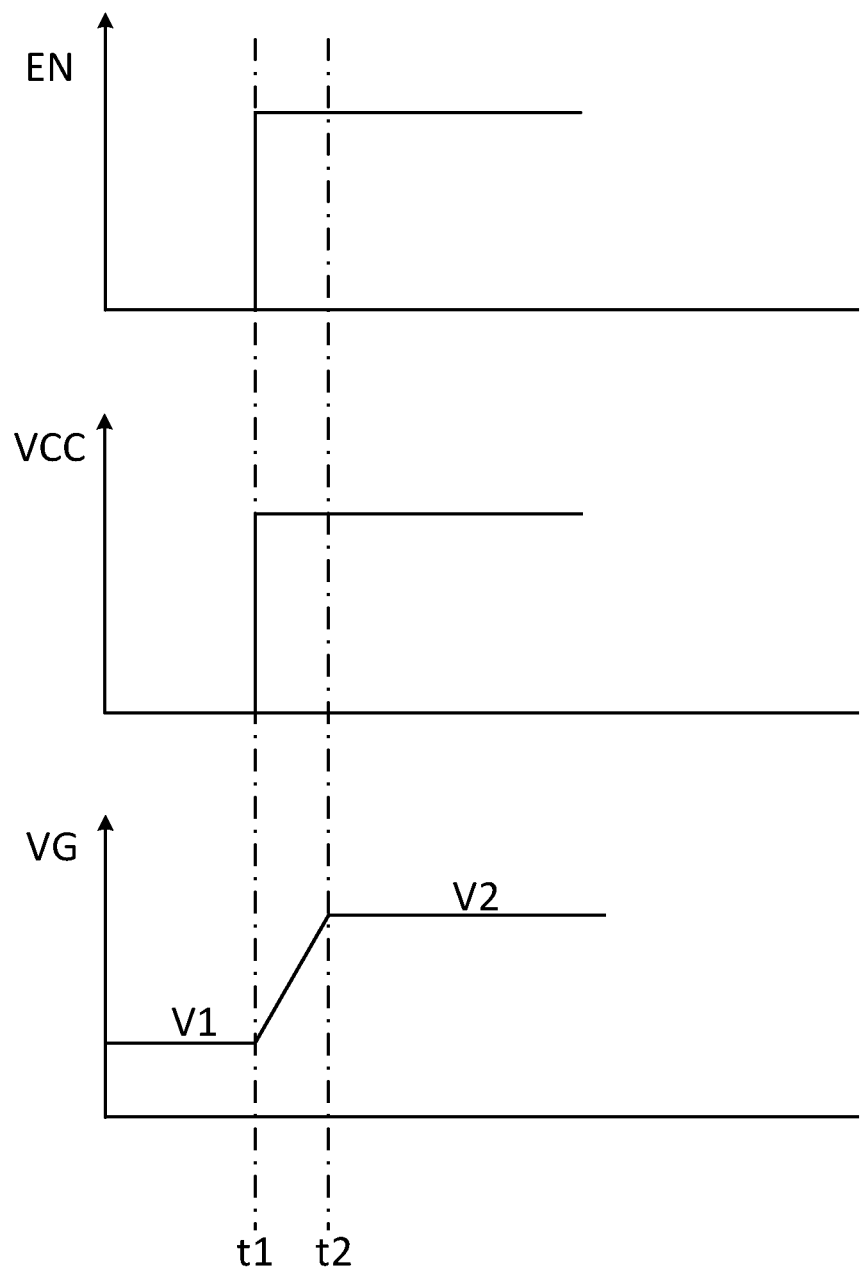
FIG. 5 illustrates a second implementation of the gate drive control scheme applied to the switch S1 shown in FIG. 2 in accordance with various embodiments of the present disclosure.

FIG. 5 illustrates a second implementation of the gate drive control scheme applied to the switch S1 shown in FIG. 2 in accordance with various embodiments of the present disclosure. The horizontal axis of FIG. 5 represents intervals of time. There may be three rows in FIG. 5. The first row represents the enable signal EN. The second row represents the bias voltage VCC. The third row represents the gate drive signal applied to the switch S1.

As shown in FIG. 5, prior to t1, EN is of a logic low state. In response to this logic low state, the LDO 120 is turned off. The bias voltage VCC is approximately equal to zero. VG is at a first predetermined voltage V1. In some embodiments, V1 is about equal to the turn-on threshold of the switch S1. In some embodiments, V1 is selected such that the switch S1 functions as a large resistor. Such a large resistor can reduce the leakage current flowing through the first clamping device M1.

At t1, the enable signal EN changes from a logic low state to a logic high state. In response to this change, the LDO 120 is turned on and VCC is established at t1. From t1 to t2, the gate voltage of the switch S1 is increased in a linear manner from the first predetermined voltage V1 to a second predetermined voltage V2. At t2, the second predetermined voltage V2 fully turns on the switch S1. Once S1 is fully turned on, a conductive path is formed between the input/output pad CTRL and the input of the buffer 110.

One advantageous feature of the gate drive control scheme shown in FIG. 5 is that the leakage current can be reduced to a low level before VCC is established at t1. From t1 to t2, the conductive path is built up in a gradual manner. In other words, the normal CTRL function is obtained in a gradual manner without the predetermined delay shown in FIG. 4.

Figure 6:
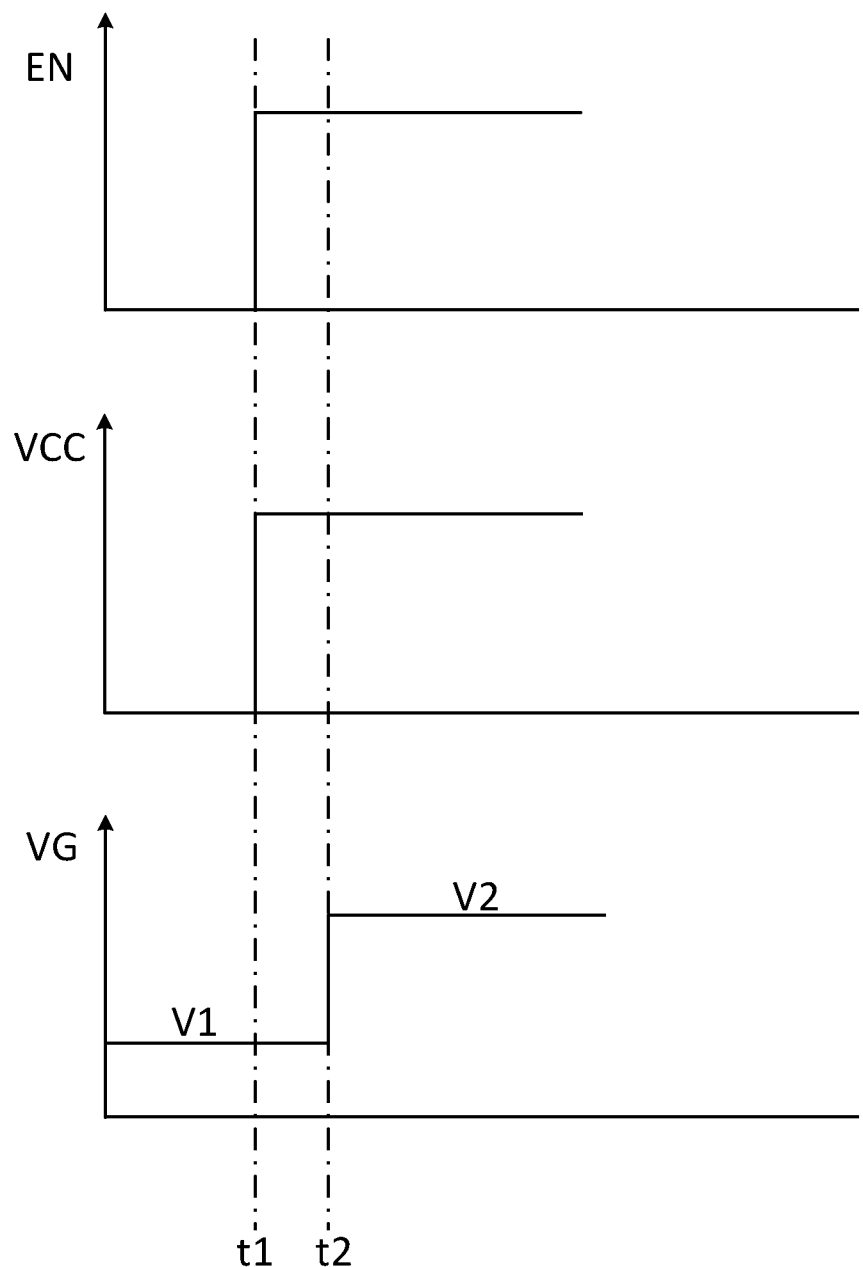
FIG. 6 illustrates a third implementation of the gate drive control scheme applied to the switch S1 shown in FIG. 2 in accordance with various embodiments of the present disclosure.

FIG. 6 illustrates a third implementation of the gate drive control scheme applied to the switch S1 shown in FIG. 2 in accordance with various embodiments of the present disclosure. The horizontal axis of FIG. 6 represents intervals of time. There may be three rows in FIG. 6. The first row represents the enable signal EN. The second row represents the bias voltage VCC. The third row represents the gate drive signal applied to the switch S1.

As shown in FIG. 6, prior to t1, EN is of a logic low state. In response to this logic low state, the LDO 120 is turned off. The bias voltage VCC is approximately equal to zero. VG is at a first predetermined voltage V1. In some embodiments, V1 is about equal to the turn-on threshold of the switch S1. V1 is selected such that S1 functions as a large resistor. Such a large resistor can reduce the leakage current flowing through M1.

At t1, the enable signal EN changes from a logic low state to a logic high state. In response to this change, the LDO 120 is turned on and VCC is established at t1. From t1 to t2, the gate voltage of the switch S1 stays at the first predetermined voltage V1. At t2, VG changes from the first predetermined voltage V1 to a second predetermined voltage V2. The second predetermined voltage V2 fully turns on the switch S1. Once the switch S1 is fully turned on, a conductive path is formed between the input/output pad CTRL and the input of the buffer 110.

Figure 7:
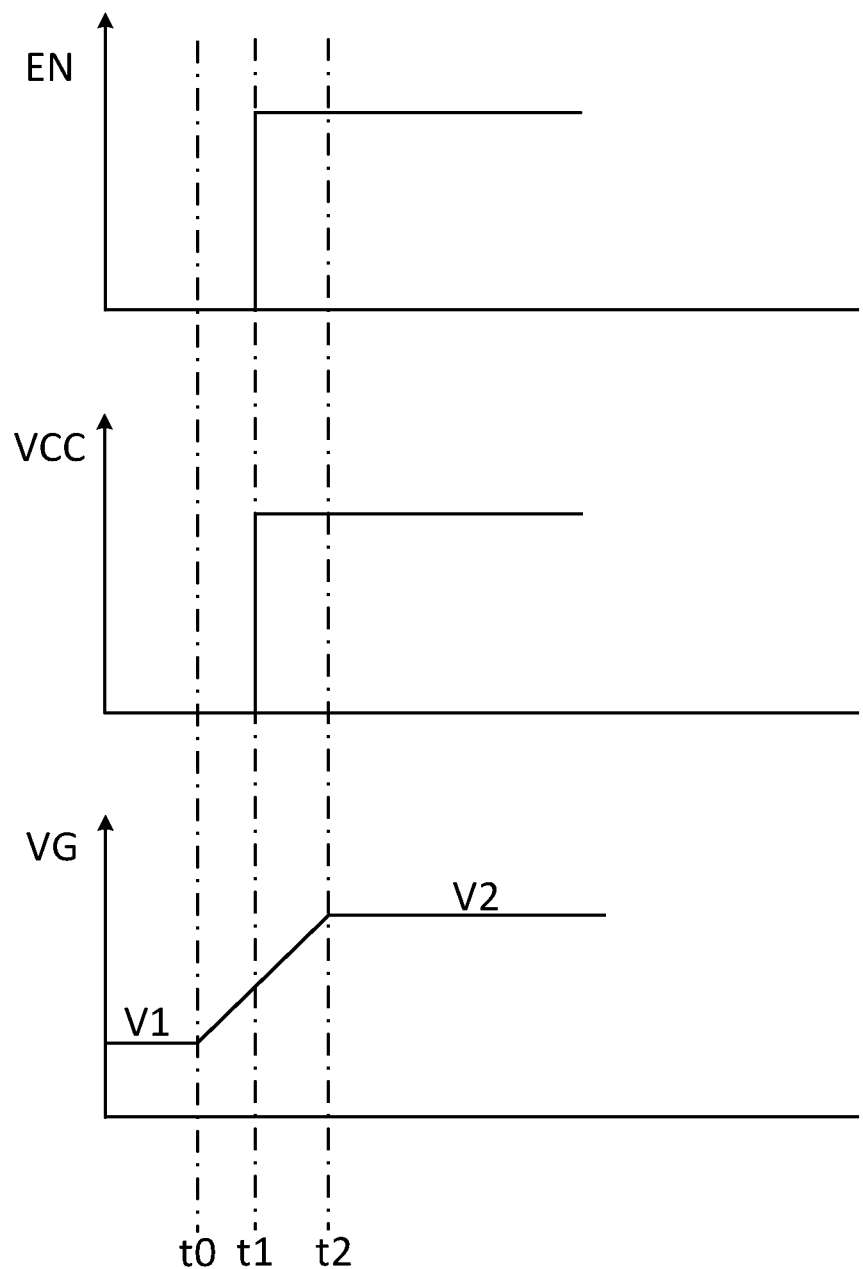
FIG. 7 illustrates a fourth implementation of the gate drive control scheme applied to the switch S1 shown in FIG. 2 in accordance with various embodiments of the present disclosure.

FIG. 7 illustrates a fourth implementation of the gate drive control scheme applied to the switch S1 shown in FIG. 2 in accordance with various embodiments of the present disclosure. The horizontal axis of FIG. 7 represents intervals of time. There may be three rows in FIG. 7. The first row represents the enable signal EN. The second row represents the bias voltage VCC. The third row represents the gate drive signal applied to the switch S1.

As shown in FIG. 7, prior to t1, EN is of a logic low state. In response to this logic low state, the LDO 120 is turned off. The bias voltage VCC is approximately equal to zero. Prior to t0, VG is at a first predetermined voltage V1. In some embodiments, V1 is about equal to the turn-on threshold of the switch S1. V1 is selected such that S1 functions as a large resistor. Such a large resistor can reduce the leakage current flowing through M1.

At t1, the enable signal EN changes from a logic low state to a logic high state. In response to this change, the LDO 120 is turned on and VCC is established at t1. From t0 to t2, the gate voltage of the switch S1 is increased in a linear manner from the first predetermined voltage V1 to a second predetermined voltage V2. At t2, the second predetermined voltage V2 fully turns on the switch S1. Once S1 is fully turned on, a conductive path is formed between the input/output pad CTRL and the input of the buffer 110.

One advantageous feature of the gate drive control scheme shown in FIG. 7 is that the leakage current can be reduced to a low level prior to t0. In addition, the duration between t0 and t1 can be dynamically adjusted depending on different applications and design needs. At t1, VG reaches a voltage level high enough to lower the on resistance of S1 so as to quickly recover the normal operation of CTRL.

Figure 8:
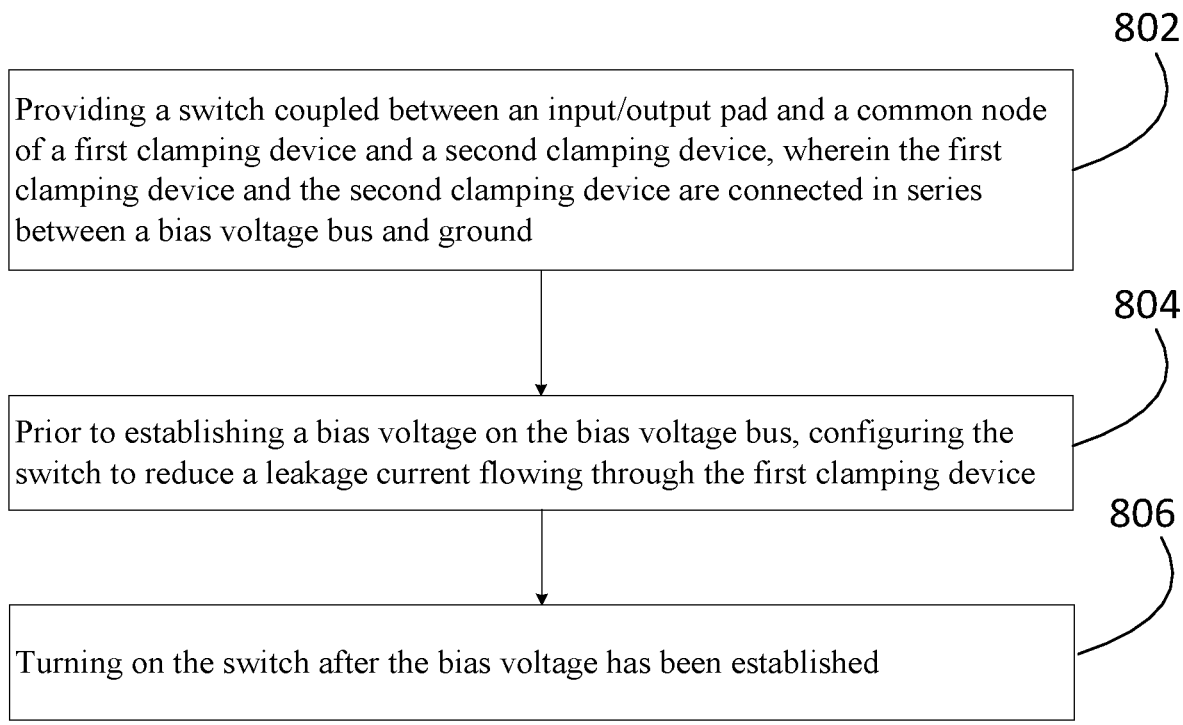
FIG. 8 illustrates a flow chart of controlling the ESD protection apparatus shown in FIG. 1 in accordance with various embodiments of the present disclosure.

FIG. 8 illustrates a flow chart of controlling the ESD protection apparatus shown in FIG. 1 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

Referring back to FIG. 2, a first clamping device M1 and a second clamping device M2 are connected in series between a bias voltage bus VCC and ground. A switch S1 is coupled between an input/output pad CTRL and a common node of the first clamping device and the second clamping device. A low-dropout regulator 120 is configured to provide the bias voltage. The low-dropout regulator 120 is controlled by an enable signal EN. A load 130 is coupled to the bias voltage bus VCC. The switch S1 is controlled to prevent a leakage current from flowing from the input/output pad CTRL to the load 130.

At step 802, a switch is provided in an ESD apparatus. The switch is coupled between an input/output pad and a common node of a first clamping device and a second clamping device. The first clamping device and the second clamping device are connected in series between a bias voltage bus and ground.

At step 804, prior to establishing a bias voltage on the bias voltage bus, the switch is configured to reduce a leakage current flowing through the first clamping device.

At step 806, the switch is turned on after the bias voltage has been established.

The method further comprises turning on the switch after receiving a system command.

Referring back to FIG. 4, the method further comprises feeding an enable signal to a low-dropout regulator, generating, by the low-dropout regulator, the bias voltage at a first time instant once receiving the enable signal, and after a predetermined delay from the first time instant, turning on the switch at a second time instant.

Referring back to FIG. 5, the method further comprises feeding an enable signal to a low-dropout regulator, generating, by the low-dropout regulator, the bias voltage at a first time instant once receiving the enable signal, and from the first time instant to a second time instant, increasing a gate voltage of the switch in a linear manner from a first predetermined voltage to a second predetermined voltage.

Referring back to FIG. 6, the method further comprises feeding an enable signal to a low-dropout regulator, generating, by the low-dropout regulator, the bias voltage at a first time instant once receiving the enable signal, and after a predetermined delay from the first time instant, increasing a gate voltage of the switch from a first predetermined voltage to a second predetermined voltage at a second time instant.

Referring back to FIG. 7, the method further comprises further comprising feeding an enable signal to a low-dropout regulator, generating, by the low-dropout regulator, the bias voltage at a first time instant once receiving the enable signal, and prior to feeding the enable signal to the low-dropout regulator, increasing a gate voltage of the switch in a linear manner from a first predetermined voltage until the gate voltage reaches a second predetermined voltage at a second time instant.

In some embodiments, the gate voltage of the switch is increased before the enable signal is applied to the low-dropout regulator. After a predetermined delay from the first time instant, the gate voltage of the switch reaches the second predetermined voltage.

The method further comprises turning on the switch after the bias voltage is greater than or equal to a voltage on the input/output pad.

Referring back to FIG. 2, the switch, the first clamping device and the second clamping device are in a semiconductor chip. The semiconductor chip further comprises a first resistor connected between the switch and the common node of the first clamping device and the second clamping device, a second resistor connected between the switch and the input/output pad, a grounded-gate n-type transistor connected between the input/output pad and ground, a low-dropout regulator configured to provide the bias voltage, wherein the low-dropout regulator is controlled by an enable signal, a load coupled to the bias voltage bus, a buffer having an input connected to the common node of the first clamping device and the second clamping device, a delay control unit configured to receive the enable signal and the bias voltage, and a filter having an input coupled to an output of the delay control unit and an output configured to generate a gate drive signal for controlling the switch.

Referring back to FIG. 2, the first clamping device is a p-type transistor. A source terminal of the p-type transistor is connected to the bias voltage bus. A body terminal of the p-type transistor is connected to the bias voltage bus. A gate terminal of the p-type transistor is connected to the bias voltage bus. A drain terminal of the p-type transistor is connected to the second clamping device. The second clamping device is an n-type transistor. A source terminal of the n-type transistor is connected to ground. A body terminal of the n-type transistor is connected to ground. A gate terminal of the n-type transistor is connected to ground. A drain terminal of the n-type transistor is connected to the first clamping device.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. An apparatus comprising:
a first clamping device and a second clamping device connected in series between a bias voltage bus and ground;
a switch coupled between an input/output pad and a common node of the first clamping device and the second clamping device, wherein the switch is configured such that before a bias voltage on the bias voltage bus has been established, a leakage current flowing through the first clamping device is reduced;

a low-dropout regulator configured to provide the bias voltage, wherein the low-dropout regulator is controlled by an enable signal;
a load coupled to the bias voltage bus; and
a buffer having an input connected to the common node of the first clamping device and the second clamping device.

2. The apparatus of claim 1, wherein:
the first clamping device is a p-type transistor, and wherein:
   a source terminal of the p-type transistor is connected to the bias voltage bus;
   a body terminal of the p-type transistor is connected to the bias voltage bus;
   a gate terminal of the p-type transistor is connected to the bias voltage bus; and
   a drain terminal of the p-type transistor is connected to the second clamping device; and
the second clamping device is an n-type transistor, and wherein:
   a source terminal of the n-type transistor is connected to ground;
   a body terminal of the n-type transistor is connected to ground;
   a gate terminal of the n-type transistor is connected to ground; and
   a drain terminal of the n-type transistor is connected to the first clamping device.

3. The apparatus of claim 2, wherein:
the p-type transistor functions as a first clamping diode; and
the n-type transistor functions as a second clamping diode, and wherein:
   a cathode of the first clamping diode is connected to the bias voltage bus;
   an anode of the first clamping diode is connected to a cathode of the second clamping diode; and
   an anode of the second clamping diode is connected to ground.

4. The apparatus of claim 1, further comprising:
a first resistor connected between the switch and the common node of the first clamping device and the second clamping device; and
a second resistor connected between the switch and the input/output pad.

5. The apparatus of claim 1, further comprising:
a grounded-gate n-type transistor connected between the input/output pad and ground, wherein:
   a source terminal of the grounded-gate n-type transistor is connected to ground;
   a body terminal of the grounded-gate n-type transistor is connected to ground;
   a gate terminal of the grounded-gate n-type transistor is connected to ground; and
   a drain terminal of the grounded-gate n-type transistor is connected to the input/output pad.

6. The apparatus of claim 1, further comprising:
a delay control unit configured to receive the enable signal and the bias voltage, and generate a gate drive signal for controlling the switch; and
a filter having an input coupled to an output of the delay control unit and an output configured to generate the gate drive signal applied to the switch.

7. A method comprising:
providing a switch coupled between an input/output pad and a common node of a first clamping device and a second clamping device, wherein the first clamping device and the second clamping device are connected in series between a bias voltage bus and ground, and wherein a low-dropout regulator is configured to provide a bias voltage on the bias voltage bus, and wherein the low-dropout regulator is controlled by an enable signal, a load is coupled to the bias voltage bus; and a buffer has an input connected to the common node of the first clamping device and the second clamping device;
prior to establishing a bias voltage on the bias voltage bus, configuring the switch to reduce a leakage current flowing through the first clamping device; and
turning on the switch after the bias voltage has been established.

8. The method of claim 7, further comprising:
turning on the switch after receiving a system command.

9. The method of claim 8, further comprising:
generating, by the low-dropout regulator, the bias voltage at a first time instant once receiving the enable signal; and
after a predetermined delay from the first time instant, turning on the switch at a second time instant.

10. The method of claim 7, further comprising:
generating, by the low-dropout regulator, the bias voltage at a first time instant once receiving the enable signal; and
from the first time instant to a second time instant, increasing a gate voltage of the switch in a linear manner from a first predetermined voltage to a second predetermined voltage.

11. The method of claim 7, further comprising:
generating, by the low-dropout regulator, the bias voltage at a first time instant once receiving the enable signal; and
after a predetermined delay from the first time instant, increasing a gate voltage of the switch from a first predetermined voltage to a second predetermined voltage at a second time instant.

12. The method of claim 7, further comprising:
generating, by the low-dropout regulator, the bias voltage at a first time instant once receiving the enable signal; and
prior to feeding the enable signal to the low-dropout regulator, increasing a gate voltage of the switch in a linear manner from a first predetermined voltage until the gate voltage reaches a second predetermined voltage at a second time instant.

13. The method of claim 12, wherein:
the gate voltage of the switch is increased before the enable signal is applied to the low-dropout regulator; and
after a predetermined delay from the first time instant, the gate voltage of the switch reaches the second predetermined voltage.

14. The method of claim 7, further comprising:
turning on the switch after the bias voltage is greater than or equal to a voltage on the input/output pad.

15. The method of claim 7, wherein:
the switch, the first clamping device and the second clamping device are in a semiconductor chip, and wherein the semiconductor chip further comprises:
   a first resistor connected between the switch and the common node of the first clamping device and the second clamping device;
   a second resistor connected between the switch and the input/output pad;

a grounded-gate n-type transistor connected between the input/output pad and ground;

a delay control unit configured to receive the enable signal and the bias voltage; and a filter having an input coupled to an output of the delay control unit, and an output configured to generate a gate drive signal for controlling the switch.

16. The method of claim 15, wherein:

the first clamping device is a p-type transistor, and wherein:

a source terminal of the p-type transistor is connected to the bias voltage bus;

a body terminal of the p-type transistor is connected to the bias voltage bus;

a gate terminal of the p-type transistor is connected to the bias voltage bus; and a drain terminal of the p-type transistor is connected to the second clamping device; and the second clamping device is an n-type transistor, and wherein:

a source terminal of the n-type transistor is connected to ground;

a body terminal of the n-type transistor is connected to ground;

a gate terminal of the n-type transistor is connected to ground; and a drain terminal of the n-type transistor is connected to the first clamping device.

17. An integrated circuit comprising:

a first clamping device and a second clamping device connected in series between a bias voltage bus and ground;

a switch coupled between an input/output pad and a common node of the first clamping device and the second clamping device;

a low-dropout regulator configured to provide a bias voltage on the bias voltage bus, wherein the low-dropout regulator is controlled by an enable signal; and a load coupled to the bias voltage bus, and a buffer having an input connected to the common node of the first clamping device and the second clamping device, wherein the switch is controlled to prevent a leakage current from flowing from the input/output pad to the load.

18. The integrated circuit of claim 17, wherein:

prior to establishing the bias voltage, the switch is turned off to prevent the leakage current from flowing from the input/output pad to the load; and after establishing the bias voltage, the switch is turned on.

19. The integrated circuit of claim 17, further comprising:

a first resistor connected between the switch and the common node of the first clamping device and the second clamping device;

a second resistor connected between the switch and the input/output pad;

a grounded-gate n-type transistor connected between the input/output pad and ground;

a delay control unit configured to receive the enable signal and the bias voltage; and a filter having an input coupled to an output of the delay control unit, and an output configured to generate a gate drive signal for controlling the switch.

* * * * *